Dec. 11, 1962 K. R. LINKE ETAL 3,067,742

SMALLPOX VACCINE SYSTEM

Filed May 10, 1960 3 Sheets-Sheet 1

INVENTORS
KARL RICHARD LINKE
JOHN JOSEPH PETERSON
JOHN WILLIAM RIDLEY
BY Dwight J. Potter
ATTORNEY

SMALLPOX VACCINE SYSTEM

Filed May 10, 1960 3 Sheets-Sheet 2

INVENTORS
KARL RICHARD LINKE
JOHN JOSEPH PETERSON
JOHN WILLIAM RIDLEY
BY Dwight J. Potter
ATTORNEY

SMALLPOX VACCINE SYSTEM

Filed May 10, 1960 3 Sheets-Sheet 3

*INVENTORS*
KARL RICHARD LINKE
JOHN JOSEPH PETERSON
JOHN WILLIAM RIDLEY
*BY* Dwight J. Potter
*ATTORNEY*

3,067,742

SMALLPOX VACCINE SYSTEM

Karl R. Linke, Philadelphia, John J. Peterson, King of Prussia, and John W. Ridley, Folsom, Pa., assignors to American Home Products Corporation, New York, N.Y., a corporation of Delaware Filed May 10, 1960, Ser. No. 28,058
3 Claims. (Cl. 128—213)

This invention relates to an improved syringe assembly especially suited to use in administering smallpox vaccine. More particularly it relates to an improved syring assembly especially suited to use in reconstituting smallpox vaccine from a lyophilized solid vaccine, and to use in administering smallpox vaccine so reconstituted.

For many years, smallpox vaccine has been produced, sold, and stored as a ready-to-use liquid vaccine which, however, because of an inherent instability, needed to be stored under refrigeration, and even at best had limited shelf-life. Recently it has been found possible to prepare a lyophilized solid product of great stability and long shelf-life. This product can be stored without refrigeration, and its use offers a number of obvious advantages over the previously used liquid preparation.

Before use, of course, the lyophilized vaccine must be reconstituted by dissolving it in sterile distilled water, a saline solution, or other suitable and convenient vehicle. To this end it has been proposed to market a package containing the lyophilized vaccine in an ampoule suitable for use in reconstituting the vaccine and a syringe containing the sterile liquid vehicle to be used in reconstituting the vaccine; the syringe is finally used to dispense the reconstituted vaccine.

It is, of course, important to maintain sterile conditions in the reconstituting and dispensing of the vaccine. To this end it is preferred to package the lyophilized vaccine in an ampoule provided with a sterile puncturable rubber closure protected with a metal foil covering. Sterile distilled water, saline, or other suitable diluent in appropriately measured amount is contained in a syringe provided at its distal end with hollow means capable of puncturing the ampoule closure and through which fluid can be discharged from or drawn into the syringe. Such hollow means can be an injection-style needle, but as pointed out below, need not be and, in fact, preferably is not.

As is well known, the use of smallpox vaccine does not call for its injection with a needle; instead, it is only necessary to place a few drops in contact with the slightly abraded or scratched skin. Accordingly, to prevent accidental or inadvertent injection of the smallpox vaccine (which could have grave consequences to health) one of the features of our invention is that our novel syringe assembly need not even employ a needle, and if a needle is used, it may be a needle so different from ordinary injection needles that any operator, whether a physician, nurse, armed forces medical corpsman, or lay civilian defense volunteer, is certain to recognize that such needle is not intended for injection purposes. As a further precaution, when a needle is mounted on the syringe, we provide a plastic needle guard with a side outlet so that the needle need not ever be exposed in dispensing vaccine.

A serious hazard associated with the reconstituting of smallpox vaccine is presented by the possibility that an unskillful or inexperienced person might retract the syringe plunger so far as to withdraw it completely, thus spilling part or all of the springe contents on himself. Accordingly, a valuable feature of our invention is the provision of a locking collar on the proximal end of our novel syringe assembly which effectively prevents accidental withdrawal of the plunger from the said syringe.

From the foregoing, it is obvious that a discussion of this invention will include discussion of the ampoule and the syringe. Discussion of the syringe will necessarily include discussion of its several functions and of the several auxiliaries which have been found desirable in different combinations, such as special needles, needle guards, drop-by-drop dispensing tips, locking devices, protective coverings, etc. We first discuss these generally and describe their functions, and then proceed to discuss each in detail with reference to the accompanying drawings.

(1) *The Ampoule.*—The ampoule serves as the storage and shipping container for the lyophilized vaccine. It will, in general, also have served as the container in which the original vaccine was lyophilized, and therefore will have preferably a relatively short wide neck so as to favor vapor diffusion in the freeze-drying process. After completion of the freeze-drying step, it will have been sealed, preferably with a sterile and easily perforable rubber diaphragm covering or a sterile and easily perforable rubber stopper filling the opening. Preferably a tearable metal foil cover protects the rubber closure. (It will be understood that throughout this specification we use the word rubber to include compounded natural and synthetic rubbers as well as other equivalent elastomers.)

(2) *The Syringe.*—The syringe serves as the storage and shipping container in which the fluid to be used in reconstituting the vaccine is packed, and later is to serve for the temporary storage before use of the reconstituted vaccine and as a dispenser therefor. Accordingly, those parts which contact the liquid contents must be resistant to the fluids involved. We prefer to employ a syringe with a glass barrel, fited with a rubber plunger, and provided with a rubber-gasketed crimped-on needle hub which may or may not, as discussed below, bear a needle. Instead of being made of glass, the syringe barrel may be formed of a transparent or translucent plastic. The needle hub is provided with mating means adapted to mate with complementary mating means on a needle guard or dispensing tip. While we prefer use of a threaded needle hub, we can employ a needle hub with other mating means, such as a conical friction joint, a bayonet joint, a snap-on joint, etc.

The glass syringe barrel is formed with an external flange at its proximal end; such a flange contributes mechanical strength to the article and serves to position and support not merely finger rests but also the plunger-locking means discussed below.

To operate the plunger, a push rod of glass, metal, or plastic is provided. Preferably a hollow push rod of plastic is provided. If a needle is employed with this syringe, the hollow push rod may serve to protect the needle during storage and shipping. Preferably the hollow plastic push rod will be formed with a plurality of longitudinally extending radial ribs. The ribbed structure gives added strength and the ribs serve to keep the push rod centered in the syringe barrel. Preferably, we employ a push rod having an even number, e.g., 4, 6, or 8 ribs evenly spaced about its circumference, so that at least one rib will be diametrically opposite another rib.

(3) *The Locking Clamp.*—After the vaccine has been reconstituted in the ampoule, it is to be drawn up into the syringe by retracting the syringe plunger. At this stage of proceedings there is a danger that an unskilled operator or one inattentive as a result of fatigue or distractions might withdraw the rubber plunger completely from the syringe instead of merely moving the plunger towards or up to the syringe open end. Accidental withdrawal of the plunger from the syringe can, of course, have serious consequences: it represents a break in the sterile technique, it may result in loss of expensive material, and may expose the operator to a dangerously high dosage of biologically active material. Accordingly, we usually provide a freely rotatable locking clamp or collar to prevent accidental withdrawal of the plunger while permitting unhampered travel of the plunger within the syringe barrel. As discussed below, this locking collar or clamp may take several forms.

(4) *The Needle.*—An injection needle is not necessary for the administration of smallpox vaccine, since, as is well understood, the vaccine is not to be injected but instead is merely to be deposited on the surface of the abraded skin. However, in discharging the fluid vaccine vehicle from the syringe into the ampoule and in then withdrawing the reconstituted vaccine back into the syringe a needle of some kind or its equivalent is desirable. When a needle is used, its function is to penetrate the rubber ampoule closure, allow fluid to be discharged into the ampoule, and then allow the reconstituted vaccine to be withdrawn into the syringe. Thereafter the needle, as such, is no longer of any use. Indeed, its very presence on the syringe presents a danger that an unskilled or inadequately trained person, e.g., a medical corpsman, a lay civil defense volunteer, etc., might by mistake inject a quantity of the vaccine with possibly very serious consequences. To make such an error as unlikely as possible, we try to give the needle an appearance completely inconsistent with its use for injection. Thus the needle may be made unusually short and of relatively large gauge. Furthermore instead of being provided with the usual beveled point, our needle may have a blunted point. The needle may have a square-cut tip or, in what we consider a preferred embodiment of our invention, may have a special rounded and doubly beveled tip.

(5) *The Needle Guard.*—Once the needle has served its final important purpose in permitting the refilling of the syringe with the reconstituted vaccine, it is, as above pointed out, not merely no longer needed, but its very presence constitutes a danger. Accordingly, we cover it then with a needle guard which serves as a drop-by-drop dispensing tip. This tip is preferably formed of a resiliently distortionable plastic material such as polyethylene or polypropylene and is provided with an axial cavity or bore into which the needle can fit and which communicates at its distal end with a radial bore constituting a conduit which extends a short distance beyond the main surface of the said needle guard as a very narrow, thin-walled tube. Preferably one or more circumferential constrictions in the main axial bore of this needle guard forms a liquid-tight seal around the needle. The said needle guard is provided at its proximal end with mating means adapted to mate with the mating means of the needle hub.

(6) *An Alternative Syringe Tip Combining the Functions and Advantages of the Needle and Needle Guard.*—As above pointed out, the only function of the needle is to facilitate transfer of fluid from syringe to ampoule and back again; the function of the needle guard is to protect the needle, discourage any attempt to use it for injections, and to provide for drop-by-drop dispensing of vaccine through a side-opening. We have found it possible to provide a single structure which serves in the transfer of fluid from syringe to ampoule and back again and which also serves as a drop-by-drop dispensing tip. This is preferably formed of a hard plastic material, such as a polystyrene or a polymethacrylate and is provided with a sharpened tip at its distal end capable of penetrating the rubbery closure of the ampoule. The side-delivery tube communicating with the axial bore extends from a recessed area on the side of the said structure and is wholly contained within said recess. By being contained within this recess, the side tube is protected from breakage when the said dispensing tip is being inserted in or withdrawn from the rubber cover of the ampoule.

(7) *Needle Seals and Dispensing Tip Seals.*—As above pointed out, our syringe is expected to serve as a shipping and storage container for the fluid to be used in reconstituting vaccine. Accordingly, it is essential that while so serving it be free from leakage whereby this fluid might become lost to use. Accordingly, when a syringe fitted with a hollow needle is used to package the reconstitution fluid, a snugly fitting needle sheath of rubber may be used to prevent leakage through the needle. To protect the needle from breakage in shipping and storage, the push rod, if hollow, may be temporarily positioned to protect the needle, as shown in U.S. Patent 2,671,449. When the combination dispensing tip and pointed closure perforator referred to in the immediately preceding paragraph is employed (without a needle) we may either employ a rubber cap seal directly over the needle hub or over the dispensing tip itself. Preferably, the dispensing tips are packaged separately, and a rubber cap seal is mounted directly on the needle hub or needle.

The invention will now be described in reference to the accompanying drawings, which drawings, however, are to be considered as illustrative only and in no way limitative of the invention.

Figure 7:

FIGURE 7 represents an ampoule suitable for use in association with the several elements of this invention. This consists simply of a small wide-mouthed bottle provided with a rubber closure, which rubber closure is preferably attenuated in a medial portion to facilitate penetration by a needle or other piercing agency. Preferably the rubber closure is covered by a tearable metal foil to maintain sterility.

Figure 8:
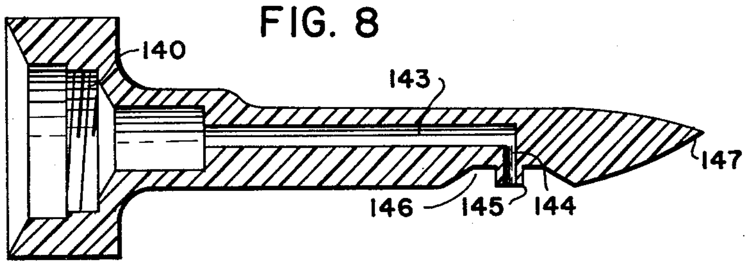

FIGURE 8 illustrates a drop-by-drop dispensing tip which is to be mounted directly on a needle hub and which eliminates the need of any needle in the practice of this invention.

Figure 1:
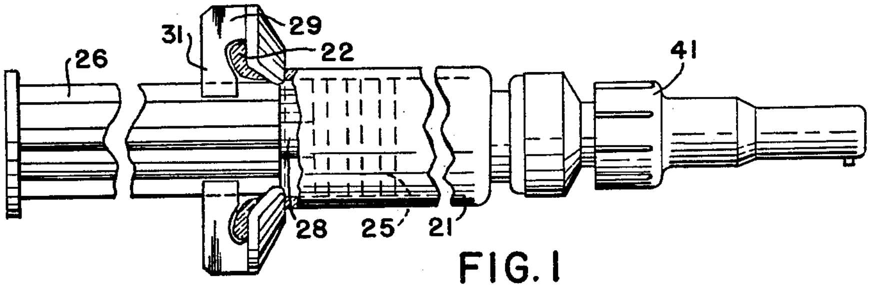
FIGURE 1 illustrates a complete syringe suitable for use in this invention.
Figure 9:
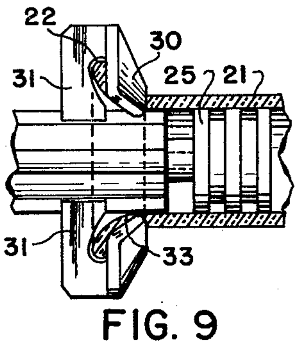
Figure 10:
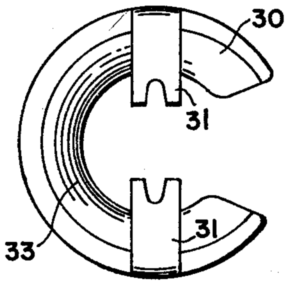

FIGURES 9 and 10 show in greater detail the locking collar indicated as 29 in FIGURE 1. FIGURE 9 shows the locking collar enclasping the syringe at its proximal end and FIGURE 10 represents a view of the proximal end of the collar alone.

Figure 11:
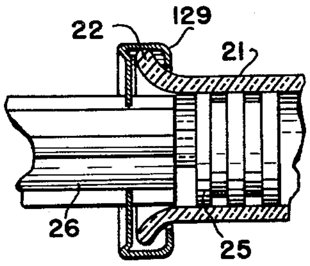
Figure 12:
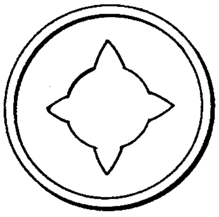

FIGURES 11 and 12 illustrate a second form of locking collar, one which completely surrounds the syringe proximal flange and which may be readily formed from soft sheet metal such as aluminum or brass by stamping and crimping. In FIGURE 11 this collar is shown in association with a syringe containing a rubber plunger and provided with a push rod cooperating therewith. FIGURE 12 is a representation of the proximal face of this locking collar.

Figure 14:
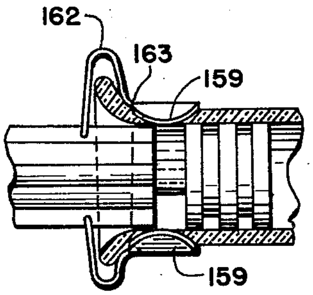
Figure 15:
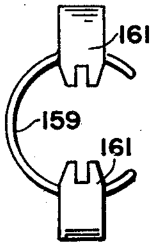
Figure 13:
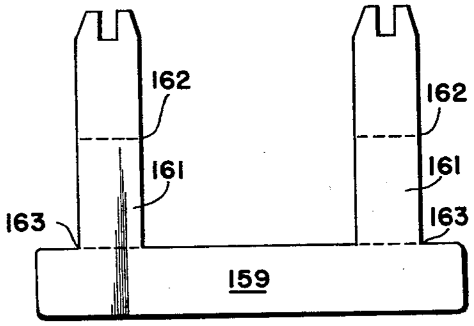

FIGURES 13, 14 and 15 illustrate a third form of locking collar which may be formed by bending a sheet metal blank having a shape as shown in FIGURE 13.

Figure 16:
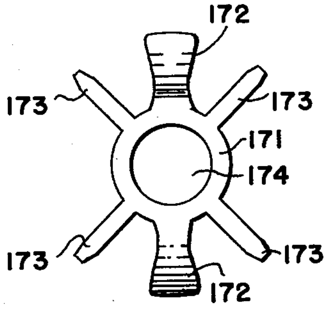
Figure 17:
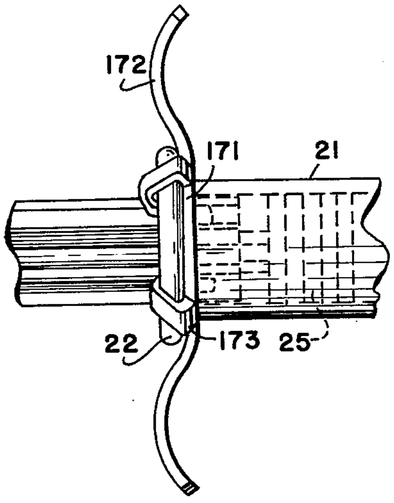
Figure 18:
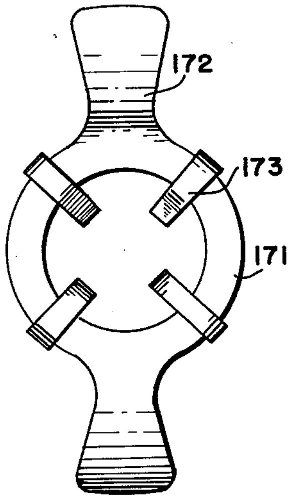

FIGURES 16, 17 and 18 illustrate a fourth form of locking collar which may be formed from a sheet metal blank as shown in FIGURE 16.

Figure 2:
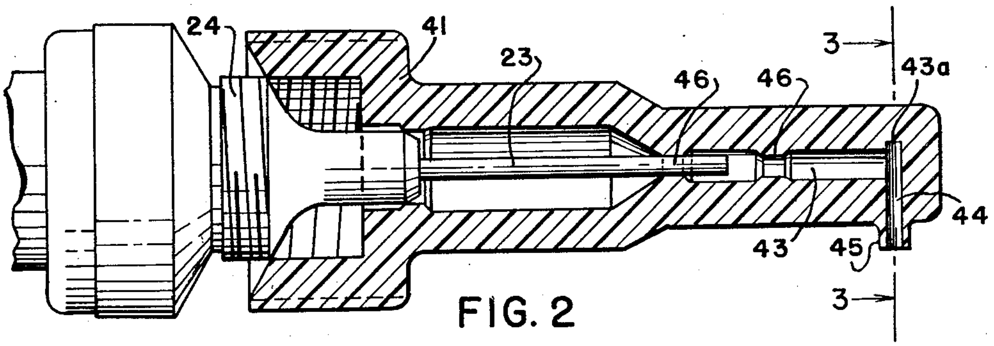
FIGURE 2 is an enlarged view of the distal portion of the assembly shown in FIGURE 1.
Figure 3:
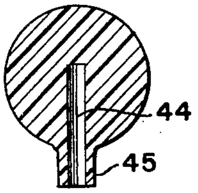
FIGURE 3 is a sectional view of the drop-by-drop dispensing tip of the syringe of FIGURE 1 taken along the plane defined by the line 3—3.

In FIGURES 1 and 2, illustrating a syringe ready for use in dispensing vaccine, there is shown a syringe barrel 21 formed with an external flange 22 at its proximal end and bearing at its distal end a permanently attached needle 23 having a threaded needle hub 24. A rubber plunger 25 is in slidable sealing engagement with the inner cylindrical surface of barrel 21. A push rod 26, having internal screw threads at its distal end, is adapted to mate with an externally threaded stud 28 which is imbedded in plunger 25. A locking collar 29 enclasps the syringe barrel at its flanged proximal end and is held in position by finger members 31 which overlap the flange and extend inwardly and distally, which finger members constitute a plunger-engaging stop which effectively prevents withdrawal of the plunger from the syringe barrel. Also shown in FIGURE 1 is a needle guard 41 provided with internal screw-threads at its proximal end. As shown in FIGURE 2, needle guard 41 is provided with an axial bore 43. Axial bore 43 terminates at a point 43*a* at which it communicates with a radial bore 44; the conduit constituted by radial bore 44 is extended beyond the adjacent walls of needle guard 41 by thin-walled tube 45. Needle guard 41 is preferably made from a resiliently deformable thermoplastic resin such as polyethylene or polypropylene and will preferably have one or more circumferential constrictions 46 in its axial bore capable of forming liquid-tight seals about needle 23. Needle 23 is shown as having a square-cut tip, but it may equally well have the novel doubly-beveled blunt tip of the needle shown in FIGURES 4, 5 and 6. If desired, needle 23 may also have the beveled sharp tip conventional with injection needles, but this is definitely not essential. In this drawing, the needle is shown as terminating at a point between the two constrictions 46; alternatively, the needle may advantageously extend to a point just short of 43*a*, thus taking advantage of the double seals represented by constrictions 46.

Operation and employment of this smallpox vaccine syringe is as follows: Lyophilized smallpox vaccine is contained in an ampoule (FIGURE 7) provided with a perforable rubber closure (preferably maintained in a sterile condition by a tearable metal foil covering), and liquid suitable for reconstituting this vaccine is supplied in the above described syringe. As supplied to the user, the needle will ordinarily be covered with a sealing rubber sheath, with the needle guard packed separately. Alternatively, the syringe assembly, filled with the reconstitution fluid, may be supplied with the needle guard in position and sealed at the open end of conduit 44 by a rubber disc held against said open end to effect a seal against loss of reconstitution liquid in shipping or storage. When it is desired to reconstitute the vaccine for use, the needle is exposed by removal of the needle-protecting rubber sealing sheath (if used) or the needle guard (if the syringe is supplied with needle guard mounted thereon). After removal of the protective metal foil from the ampoule closure (FIGURE 7), the syringe needle is pushed through the said ampoule's rubber closure, and the contents of the syringe are transferred to the ampoule by advance of the push rod. Without withdrawal of the needle from the ampoule, the whole assembly is then shaken or swirled gently, causing the solid lyophilized vaccine material to become dissolved in the reconstitution fluid. Thereupon, the reconstituted vaccine is drawn into the syringe by retraction of the push rod, the needle is withdrawn from the ampoule, and the needle guard, with conduit 45 uncovered, is mounted in place. The assembly is then ready for use in dispensing vaccine. By slowly advancing the plunger by means of the push rod, vaccine is discharged a drop at a time from the orifice of tube 45. We have found that as many as a hundred separate drops of vaccine may be dispensed from a 2-ml. capacity syringe barrel. Thus the assembly of this invention is extremely valuable in administering vaccine to large numbers of persons seriatim, as in the armed services or under disaster circumstances. The needle guard serves as a constant reminder that this syringe is not to be employed for injection.

Figure 4:
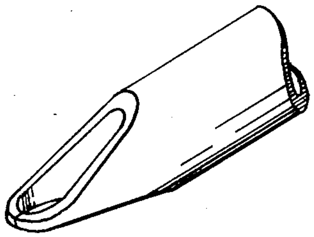
FIGURE 4 is a perspective view of a novel needle tip especially valuable in the practice of this invention.
Figure 5:
FIGURES 5 and 6 are, respectively, top and side views of the needle tip shown in FIGURE 4.
Figure 6:
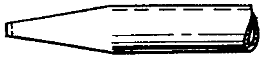

FIGURES 4, 5 and 6 illustrate a novel needle tip useful in this invention. This tip may be formed by grinding two opposed bevels on the end of a hollow square-cut needle and then bending the resulting two tongues together to form a rounded, obviously blunt tip. This needle tip is easily able to penetrate a rubber ampoule closure, yet is obviously not suitable for subcutaneous injection; it is highly unlikely that persons with even a little experience in administering medication from syringes would suppose that such a needle was intended for injection into flesh.

In FIGURE 8 is shown a drop-by-drop dispensing tip which combines in one structure the above-described functions of a needle and a dispensing tip. Preferably this dispensing tip is formed from a hard and rigid plastic material such as polystyrene or a polymethacrylate. As will be seen this dispensing tip is provided at its proximal end with internal screw-threads 140 adapted to mate with the external threads of a needle hub. An axial bore 143 extends from the proximal end towards the distal end, and communicates with a radial bore 144 which constitutes a conduit 145 which extends a short distance beyond the adjacent outer surfaces of said dispensing tip. As will be seen, this conduit 145 terminates in a recess or notch 146 in the side of the dispensing tip. The distal end of this dispensing tip is provided with a sharp point 147 capable of puncturing the rubber closure of an ampoule. Ordinarily, this dispensing tip will be used in conjunction wtih a syringe bearing a threaded "needle hub" at its distal end, but having no needle. Preferably, the said dispensing tip, mounted on a syringe containing fluid for use in reconstituting vaccine, will be protected by a removable cover formed of rubber which serves to maintain sterility and cleanliness prior to use and to prevent leakage. When it is desired to prepare a vaccine lot, it is only necessary to strip off the protective coverings from the dispensing tip and the ampoule closure, force the pointed end of the dispensing tip through the rubber closure so that its side-opening 145 is inside the ampoule, force the syringe contents into the ampoule, and then, after brief shaking or swirling, to withdraw the reconstituted vaccine back into the syringe. Vaccinations may then be performed by forcing a drop or two of the vaccine onto a prepared area of each patient's skin. The shoulders of notch 146 in the side of this dispensing tip protects extension 145 of conduit 144 from damage while the tip is being inserted into or withdrawn from the rubber ampoule closure.

FIGURES 9 and 10 show in more detail the locking collar shown as 29 in FIGURE 1. This locking collar is preferably molded from a resiliently flexible thermoplastic resin such as polyethylene or polypropylene. In FIGURE 9, the locking collar is shown to comprise a circularly curved C-ring 30 enclasping a syringe barrel 21 and in contact with the proximal flange 22, and having radially opposed locking lugs 31 extending proximally of the C-ring and then radially inward and then finally distally into the said syringe barrel, being thus adapted to overlap the proximal flange 22 of the syringe barrel. FIGURE 10 represents this locking collar alone as it appears when viewed from its proximal end. Lugs 31 are shown as terminating in grooved ends, said grooves being adapted to serve as guides for a longitudinally ribbed push rod. The ends of lugs 31 are close enough together to prevent passage of rubber plunger 25. Surface 33 is concave and frustoconical, allowing a snug fit against the external flange of the syringe barrel.

This locking collar is easily removed from or mounted on a syringe barrel by forcing the barrel through the open side of the C-ring; insertion of a ribbed push rod through the collar into the barrel, the ribs of the push rod engaging the grooved ends of lugs 31, effectively prevents such easy removal.

FIGURES 11 and 12 illustrate a form of locking collar 129 which completely encircles syringe barrel 21 and also completely overlaps the barrel flange 22. This form of locking collar is preferably formed of a relatively soft and malleable metal and is preferably formed in situ by a crimping operation from a disc-shaped blank having a central opening adapted to receive a push rod 26 but small enough to prevent passage of rubber plunger 25. FIGURE 12 shows a proximal view of collar 129 and shows a star-shaped opening, which as above stated, is adapted to permit passage of a ribbed push rod but to retain a rubber plunger.

FIGURES 13, 14 and 15 illustrate a locking collar readily formed from a resilient sheet material such as steel or bronze. FIGURE 13 shows the flat shape from which this collar is readily formed by bending about a cylindrical mandrel to form the long band 159 into a C-ring, and then bending lugs 161 along lines 162 and 163 to form the collar as seen (from the side) in place on a syringe barrel in FIGURE 14; a proximal-end view of the collar is shown in FIGURE 15. The inward-radially extending ends of lugs 161 are shown notched so as to engage the ribs of a ribbed push rod while impeding withdrawal of a rubber plunger.

FIGURES 16, 17 and 18 illustrate another convenient form of locking collar which may be employed in this invention, and which is easily formed from a relatively soft and malleable sheet metal such as aluminum or steel. FIGURE 16 represents a sheet metal blank from which this locking collar may be formed by simple bending. As will be seen, this blank comprises an O-ring 171 bearing finger-pieces 172 and lugs 173. Central opening 174 is sized so as to just go over a syringe barrel 21 up to the distal face of its flange 22. When in place on a syringe barrel 21 (containing a plunger 25), lugs 173 are bent proximally, inward-radially, and finally distally so as to overlap and enclasp flange 22 as shown in FIGURE 17. Finger pieces 172 may be bent into a curve, as shown, or left flat. FIGURE 18 is a proximal view of this locking collar, and is believed to be self-explanatory.

In FIGURE 1, the plunger 25 is shown as having an externally threaded stud protruding from its proximal end adapted to mate with internal screw threads on the distal end of push rod 26. While this is a preferred arrangement, it is perfectly practical for the push rod to be externally threaded to mate with internal threads of the plunger. Furthermore, other means of attaching the push rod to the plunger may be employed if desired. For example, the distal end of the push rod 26 may be self-threading as shown in U.S. Patent No. 2,832,340. Naturally, if a locking collar is employed, the plunger-push rod mating means must be compatible with the use of the locking collar selected. For example, although a push rod and plunger which can be assembled to each other only before insertion in the syringe barrel would be entirely unsuitable for use in connection with the locking collar shown in FIGURES 1, 9 and 10, it would be quite feasible to employ such an assemblage with the locking collar of FIGURES 16, 17 and 18.

Similarly, the preferred mating means for fixedly mounting our dispensing tips to the needle hubs comprises external screw threads on the needle hub and complementary internal screw threads on the dispensing tips; nevertheless, the employment of other and functionally equivalent mating means is within the scope of this invention. Thus conical-friction joints, as well as snap-on joints or bayonet joints, may be employed.

What is claimed is:

1. A drop-by-drop dispensing tip for a syringe capable of wholly enclosing a hollow needle provided with a threaded hub, said dispensing tip comprising a generally cylindrical elongated body having an axial bore adapted to receive said needle, said bore being provided at its proximal end with internal screw threads adapted to mate with the external screw threads of a needle hub, said axial bore terminating proximally of the distal end of said tip, said tip being provided with a single integral minute exterior nipple near its distal end having a radial bore communicating with the distal end of said axal bore from which discrete drops of liquid may be discharged by operation of the syringe push rod, said dispensing tip being formed of a resiliently flexible resin and having at least one circumferential constriction in said axial bore adapted to provide a liquid-tight seal about a cylindrical portion of a hollow needle.

2. In a syringe for both aspirating and delivering serially small drops of reconstituted vaccine, said syringe comprising a barrel, a slideable plunger in the barrel, a freely slideable push rod engageable with the plunger for advancing and retracting it, a locking collar secured on the proximal end of the barrel with an orifice permitting free sliding of the push rod therethrough but small enough to prevent inadvertent withdrawal of the plunger from the barrel, and a hub of smaller diameter than the barrel secured to the distal end of the barrel and defining an opening for the aspiration and expulsion of liquid, a hollow aspirating needle being fixedly mounted in said hub, the proximal end of said needle communicating with the interior of the barrel, the improvement that comprises in combination with said syringe a generally cylindrical dispensing tip removably secured to said barrel hub, having an axial bore into which extends the distal end of said hollow needle, said axial bore terminating short of its distal end, a single minute nipple formed integrally on the outer surface of the dispensing tip near its distal end, and a radial bore within said nipple communicating with said axial bore, whereby on the regulated expulsion of liquid from the syringe, small uniform drops form on and fall successively from said nipple.

3. The combination defined in claim 2 comprising the further improvement that the aspirating needle is provided with a blunt tip, said tip being U-shaped in one longitudinal section, and V-shaped in a section taken on a longitudinal plane at right angles to the plane of said first section, with a pear-shaped opening into the bore of said needle on each of the two bevels which define said V, the small end of said pear-shaped openings being farther from the needle tip than the large end of said pear-shaped openings.

References Cited in the file of this patent

UNITED STATES PATENTS

| | | |
|---|---|---|
| 772,114 | Pappenheim | Oct. 11, 1904 |
| 1,970,688 | Callahan | Aug. 21, 1934 |
| 2,140,409 | Sterling | Dec. 13, 1938 |
| 2,503,341 | Kissileff | Apr. 11, 1950 |
| 2,626,590 | Smith | Jan. 27, 1953 |
| 2,672,866 | Kater | Mar. 23, 1954 |
| 2,746,455 | Abel | May 22, 1956 |
| 2,868,201 | Gabriel | Jan. 13, 1959 |
| 2,954,768 | Hamilton | Oct. 4, 1960 |